United States Patent Office 3,836,510
Patented Sept. 17, 1974

3,836,510
VINYL HALIDE TERPOLYMER AND BULK
PROCESS FOR PREPARATION
Akio Takahashi, Amherst, N.Y., assignor to Hooker
Chemical Corporation, Niagara Falls, N.Y.
No Drawing. Filed Dec. 27, 1972, Ser. No. 319,076
Int. Cl. C08f 15/40
U.S. Cl. 260—78.5 R 7 Claims

ABSTRACT OF THE DISCLOSURE

An improved polyvinyl halide terpolymer containing up to 20 percent of a vinyl monomer such as a vinyl ester monomer in combination with maleic or itaconic anhydride can be obtained by polymerizing the monomers in a process of bulk polymerization comprising a single stage or two-stage polymerization process wherein high speed agitation is used during the first stage and low speed agitation is used in the second stage. The products of the process are characterized by improved processability, increased solubility in organic solvents and reduced particle size. The products of the invention are more readily processable without decomposition by thermal means. Additionally, cross-linked rigid products can be easily obtained through reaction of the anhydride group in the product with such cross-linking agents as polyfunctional alcohols, amines, epoxides and isocyanates.

BACKGROUND OF THE INVENTION

Field of the Invention

This invention relates to the preparation of terpolymers of vinyl halide such as vinyl chloride having improved thermal processability, reduced grain size, improved solubility in organic solvents and which are cross-linkable. The polymers are useful in the production of films, coatings, and molded articles. The products can be produced using either single stage or two stage methods of bulk polymerization.

It is known to produce vinyl halide terpolymers such as a terpolymer of vinyl chloride, vinyl acetate and maleic acid, by emulsion and suspension polymerization processes. Such products show improved thermal processability, improved adhesion to organic or inorganic surfaces, increased solubility in organic solvents and improved thermal processability. Such terpolymers are produced by conventional polymerization processes consisting of emulsion, suspension, and solution processes in which maleic or itaconic anhydride cannot be used without decomposition to maleic acid or itaconic acid which show in such a system far less reactivity than maleic or itaconic anhydride which can be used without decomposition in the bulk process of polymerization. As is well known the anhydride group of maleic or itaconic anhydride is very reactive with materials containing active hydrogen such as water, alcohols and amines to give the free acid, an ester, or an acid-amide. Heretofore, it has been very difficult and the process has taken a very long time for reaction and thus a reasonable conversion from aqueous, emulsion, suspension, or solution systems cannot be obtained with reasonable economy.

Additionally, the terpolymers of the prior art based upon maleic acid are not readily cross-linkable so as to obtain polymers having reduced organic solvent solubility. By contrast the polymers of the invention can be readily cross-linked since the anhydride group of the terpolymer of the invention is reactive with cross-linking agents.

Description of the Prior Art

Polyvinyl chloride terpolymers have been produced by conventional emulsion, suspension, and solution systems of polymerization based upon combinations of such monomers as vinyl chloride, vinyl acetate and maleic acid. The efficiency and speed of such polymerization processes leaves much to be desired since the rate of reaction of the various monomers differs and the polymerization rate of the slowest reacting monomer present reduces the reaction rate and thus increases the processing time. The reaction with maleic acid is very slow. Yields are quite low unless the process is allowed to run for long periods.

In U.S. 2,147,154 there is disclosed a method of producing a polymerization product of vinyl chloride by polymerizing said vinyl chloride with 0.5 to 3 percent of an alpha,beta-unsaturated carboxylic acid. The vinyl chloride can be used alone or in admixture with vinyl esters such as acrylic acid esters, acrylic acid, nitriles, or styrene. The polymerization can be conducted in mass. The emulsion polymerized product is subsequently treated with a strongly alkaline material in a liquid medium adjusted to a pH of 7.5 to 12.

U.S. 2,462,422 relates to the emulsion polymerization of a polymer comprising vinyl chloride, vinyl acetate, and maleic anhydride. The object of the invention was to develop a process for the preparation of polymers and copolymers of vinyl halide which would be extremely rapid even at moderate temperatures. It is apparent that the water present in an aqueous polymerization system would decompose the maleic anhydride to maleic acid and thereby result in the slow rate of polymerization that characterizes reactions with maleic acid.

U.S. 2,460,573 discloses polymerization of vinylidene halide with at least two other types of polymerizable materials; namely, diesters of maleic acid and vinyl esters of organic or inorganic acids. Such polymers are disclosed as comprising vinylidene halide, vinyl chloride, vinyl acetate and a maleic acid ester. As the method of polymerization, bulk polymerization is disclosed but only polymerization in an aqueous dispersion is emphasized. Such polymers show better heat and light stability than polymers of vinylidene halides alone or than copolymers of vinylidene halides with vinyl esters.

SUMMARY OF THE INVENTION

This invention relates to a method of polymerization in bulk of a vinyl halide in contact with a vinyl ester monomer and an unsaturated organic acid anhydride selected from the group consisting of maleic or itaconic anhydride in a process of polymerization which can be a single stage bulk polymerization or a two stage bulk polymerization wherein high speed, high sheer agitation is used during a first stage and low speed, low sheer agitation is used during a second stage. An average polymer product grain size can be obtained of about 20 to about 40 microns.

In another aspect of this invention, a method is provided for obtaining an easy processing vinyl halide terpolymer by the free radical initiation of a vinyl halide monomer in combination with a vinyl ester monomer and maleic or itaconic anhydride. Such terpolymers show improved solubility in organic solvents and exhibit the property of improved adhesion to organic and inorganic surfaces as compared to a vinyl halide polymer. Additionally, the terpolymers of the invention can be readily cross-linked with polyfunctional alcohols, amines, epoxides and isocyanates as a result of the presence of the anhydride group in the polymer chain.

The terpolymers of the invention show improved thermal processability and can be processed without any decomposition or discoloration as a result of the fact that the terpolymers can be processed at lower temperatures as compared to polyvinyl halide polymers and copolymers having comparable physical properties. It can be considered that the terpolymers are internally plasticized as the result of polymerization in contact with the vinyl ester monomer in the presence of maleic or itaconic anhydride.

DESCRIPTION OF THE PREFERRED EMBODIMENTS

The present invention in one aspect is directed to a process for preparing small particle size, easy processing, improved organic solvent soluble, vinyl halide terpolymers by either a single stage or two stage bulk polymerization process by the polymerization of a vinyl halide monomer composition comprising at least about 70 weight percent vinyl halide in the presence of about 1 to about 20 weight percent of a vinyl ester and from about 1 to about 10 weight percent of maleic or itaconic anhydride all based on the weight of the total monomer composition. Preferably, the proportion of vinyl ester monomer is about 5 to about 15 percent by weight on the weight of the vinyl halide monomer and the proportion of maleic or itaconic anhydride is about 1 to about 5 percent by weight on the weight of the vinyl halide monomer. The preferred amount of vinyl ester monomer and maleic or itaconic anhydride can also be determined in terms of molar ratio. Thus, the preferred molar ratio of maleic or itaconic amhydride to vinyl ester monomer is about 0.1 to about 1. The vinyl ester monomers contemplated for use in combination with a vinyl halide monomer contains the general grouping $CH_2=CH-$ and has 2–20 carbon atoms in the ester group. These monomers comprise esters of vinyl alcohol, for instance, vinyl acetate, vinyl propionate, vinyl laurate, vinyl butyrate, vinyl isobutyrate, vinyl valerate, vinyl caproate, vinyl pelargonate, vinyl glycolate, vinyl lactate, and vinyl stearate. Generally, the larger the carbon number of side chain ester group, the higher internal plasticizing effect and the lower compatibility with the polyvinyl halide. Therefore, a vinyl ester with two to about twenty carbon atoms in the ester group is preferred as comonomer. It should be noted that maleic or itaconic acid is not equivalent to maleic anhydride or itaconic anhydride in the process of the invention.

More particularly, the present invention relates to bulk polymerized vinyl halide terpolymers in which, in addition to a vinyl halide and maleic or itaconic anhydride, the vinyl monomer is selected from the group consisting of vinyl esters, that is, esters of vinyl alcohol, for instance, vinyl acetate, vinyl laurate, vinyl butyrate, or vinyl stearate. The polymerization is conducted in a single or two-stage bulk polymerization process which process provides speed and economy over the aqueous suspension or emulsion polymerization processes of the prior art.

While it is preferred that the vinyl halide monomer composition be comprised totally of vinyl halide monomer, in the present invention vinylidene halide can be used as a substitute therefor to replace up to 50 percent of the vinyl halide monomer but, in any case, the composition of the terpolymer should include the heretofore stated proportions of vinyl ester monomer such as a vinyl ester as exemplified by vinyl acetate. The polymers of the invention are formed by bulk polymerization using free radical polymerization initiators at temperatures between 25 and 90 degrees centigrade. Useful free radical initiators are organic or inorganic peroxides, persulfates, ozonides, hydroperoxides, peracids and percarbonates, azo compounds, diazonium salts, diazotates, peroxy sulfonates, trialkyl fluorine-oxygen systems, and amine oxides. Azobisisobutyronitrile is particularly useful in the present invention. The catalyst is used in concentrations ranging from about 0.01 to about 1.0 percent by weight based on the total weight of the monomers. For use in bulk polymerization, the catalysts which are soluble in the organic phase, such as benzoyl peroxide, diacetyl peroxide, azobisisobutyronitrile or diisopropyl peroxydicarbonate, azobis(alpha-methyl-gamma-carboxybutyronitrile), caprylyl peroxide, lauroyl peroxide, azobisisobutyramidine hydrochloride, t-butylperoxypivalate, 2,4-dichlorobenzoyl peroxide, azobis (alpha, gamma-dimethyl-valeronitrile), and 2,2'-azobis (2,4-dimethyl valeronitrile) are generally used. Preferably, the initiator which is used is chosen from a group of initiators known in the prior art as the "hot catalysts" or those which have a high degree of free-radical initiating activity. Initiators with a lower degree of activity are less desirable in that they require longer polymerization times.

The polymerization products of the present invention can be admixed with various conventional inert additives, such as fillers, dyes, and pigments. In addition, the polymerization products can be admixed with plasticizers, lubricants, thermostabilizers and ultraviolet light stabilizers as desired.

All other conditions and measures of the method of the invention are those conventionally employed in the previously known methods for the bulk polymerization of vinyl chloride involving two stage polymerization as disclosed in British Pat. 1,047,489 and U.S. Pat. 3,522,227. In the following abbreviated description of the process, for the sake of simplicity, the initial stage of the polymerization or copolymerization will be referred to as first stage reaction and the vessel in which this initial stage of polymerization is carried out will be referred to as "Prepolymerizer." The final or complementary stage of the polymerization will be called simply second stage reaction and the vessel in which it is carried out the "Polymerizer."

In the first stage reactor, the means chosen to agitate the monomer or monomers is of a type capable of providing high shear and is commonly referred to as a "radial turbine type" agitator. At the start of the first stage reaction, the Prepolymerizer is charged with a monomer composition to which a catalyst has been added. Any polymerization catalyst generally used in bulk polymerization methods, that is, those hereinabove described can be used to an extent which is usual for bulk polymerization processes. After addition of the vinyl chloride monomer, vinyl ester, and maleic anhydride comonomers to the first stage reactor, a small amount of monomer is vented in the process of removing the air from the first stage reactor vessel. The speed of the turbine type agitator generally lies between 500 and 2,000 revolutions per minute or a tip speed of about 2 to 7 meters per second in the first stage reactor. A tip speed of about 0.5 to about 2 meters per second is used in the second stage reactor. These figures should not be regarded as limiting values. As soon as a conversion of at least about 3 to about 20 percent of the monomer composition has been obtained in the first reactor, the contents of the vessel are transferred to a second stage polymerizer vessel equipped to provide slow speed, low shear agitation so as to insure proper temperature control of the reaction medium.

The reaction temperature in both first and second stage reactors generally is about 25 degrees centigrade to about 90 degrees centigrade, preferably about 40 to about 80 degrees centigrade. The reaction pressure (gauge) in the first stage reactor generally is about 130 pounds per square inch to about 210 pounds per square inch, preferably about 150 to about 190 pounds per square inch. The reaction pressure in the second stage reactor generally ranges between about 80 to about 210 pounds per square inch, preferably between about 90 to about 190 pounds per square inch.

The optical microscope and sieve analysis were used as a method of determining average particle size. A magnification of 155 times was used together with an eye piece having a scale graduated in microns to determine the average particle size directly in microns. A 325 mesh screen having openings of 44 microns was used. An average polymer product grain size can be obtained of about 20 to about 40 microns.

In order to further illustrated this invention but without being limited thereto, the following examples are given. In this specification and claims, all parts and percentages are by weight, all pressures are gauge pressures, and all temperatures are in degrees centigrade unless otherwise specified.

EXAMPLE 1

A vinyl chloride terpolymer was prepared by the following procedure: Into a glass autoclave 18.1 grams of vinyl acetate, 20.6 grams of maleic anhydride, and 0.5 grams of lauroyl peroxide and 0.15 milliliters of acetyl cyclohexane sulfonyl peroxide solution (29 percent in dimethyl phthalate) and 0.06 milliliters of 2-ethylhexyl peroxydicarbonate solution (40 percent in mineral spirits) were added. The whole mixture was cooled to 20 degrees centigrade and the atmosphere evacuated. About 520 milliliters of vinyl chloride were then charged into the autoclave and the excess monomer was allowed to evaporate until the whole solution totalled 500 milliliters (approximately 450 grams of monomeric vinyl chloride remaining). The reaction mixture was stirred and warmed to 60 degrees centigrade and held at this temperature for 5 hours, following which the reaction mixture was cooled to 20 degrees centigrade. The pressure in the autoclave was released and 200 milliliters of normal hexane containing a small amount of 2,6-di-t-butyl-p-cresol were added. The reaction mixture was filtered and dried at 50 degrees centigrade in vacuum to a constant weight.

The dried reaction product weighed 80 grams (about 16 percent conversion), and had a particle size of less than 10 microns. The chlorine analysis indicated 71 percent vinyl chloride and 29 percent vinyl acetate-maleic anhydride by weight.

A small amount of the sample was dissolved in tetrahydrofuran, mixed with a small amount of ethylene glycol, and allowed to stand a few hours at room temperature. After this, the tetrahydrofuran solvent and excess ethylene glycol were evaporated on a steam bath, washed with methanol, and dried in vacuum. The dried sample was then exposed to fresh tetrahydrofuran, however, it was now no longer soluble, which indicates that cross-linking had occurred.

EXAMPLE 2

Example 1 was repeated except that 0.5 grams of 2,2'-azobis(2,4-dimethyl valeronitrile) was substituted for lauroyl peroxide. A similar terpolymerization is carried out at 60 degrees centigrade. The reaction was stopped after three hours.

The dried reaction product weighed 187 grams (about 40 percent conversion) and showed a particle size diameter of less than 20 microns.

EXAMPLE 3

Example 2 was repeated except that vinyl acetate and maleic anhydride were omitted.

The dried reaction product weighed 171 grams (about 38 percent conversion) and showed a particle size diameter of about 80 microns.

EXAMPLE 4

The procedure of Example 1 was repeated with the following proportions of ingredients: 500 milliliters of vinyl chloride, 31 grams of vinyl stearate, 4.9 grams of maleic anhydride, 0.15 milliliters of acetyl cyclohexane sulfonyl peroxide solution (29 percent in dimethyl phthalate), 0.06 milliliters of 2-ethyl hexyl peroxy dicarbonate and 0.5 grams of 2,2'-azobis(2,4-dimethyl valeronitrile). The polymerization was carried out at 60 degrees centigrade for 3 hours.

The dried product weighed 194 grams (about 40 percent conversion) for a particle size diameter of less than 70 microns.

One gram of the powdery product was pressed between two aluminum sheets at 160 degrees centigrade using 6,000 pounds per square inch pressure for a period of 1 minute, to give a crystal clear, tough film. Under similar conditions, a transparent film is very difficult to obtain with a polyvinyl chloride homopolymer.

EXAMPLE 5

The procedure of Example 1 was repeated using the following proportions of ingredients: 500 milliliters of vinyl chloride 22.4 grams of vinyl laurate, 4.9 grams of maleic anhydride, 0.15 milliliters of acetyl cyclohexane sulfonyl peroxide solution (29 percent in dimethyl phthalate), 0.06 milliliters of 2-ethyl hexyl peroxy dicarbonate and 0.5 grams of 2,2'-azobis(2,4-dimethyl valeronitrile). The polymerization was carried out at 60 degrees centigrade over a period of 3 hours.

The dried reaction product weighed 170 grams (about 36 percent conversion and showed a particle size diameter of less than 50 microns.

One gram of the reaction product was pressed between aluminum plates as described in Example 4. A crystal clear, tough film was obtained which indicates improved processability. The clarity of the film indicates improved thermal stability as compared with a polyvinyl chloride homopolymer.

EXAMPLE 6

A two-stage bulk polymerized vinyl chloride terpolymer was made. The following ingredients were added to a stainless steel reactor equipped with a means of stirring. Ten grams of vinyl acetate, four grams of maleic anhydride, 0.1 milliliters of acetyl cyclohexane sulfonyl peroxide solution (29 percent in dimethyl phthalate), 0.25 milliliters of 2-ethyl-hexyl peroxy dicarbonate solution (40 percent in mineral spirits), and 500 grams of vinyl chloride monomer. Fifty grams of vinyl chloride were vented out and the reaction mixture was stirred at 1500 revolutions per minute at 70 degrees centigrade for a period of 30 minutes. At the end of this first stage reaction, the reaction mixture was transferred to a vertical type glass reactor containing 250 grams of vinyl chloride and 0.4 grams of azo-bisisobutyronitrile. The reaction was then continued in this second stage reactor at a temperature of 75 degrees centigrade (192 pounds per square inch gauge of vinyl chloride vapor pressure) while stirring at 235 revolutions per minute using a spiral type agitator. The reaction was allowed to proceed for a period of five hours in this second stage reactor, while a solution of 40 grams of vinyl acetate, 16 grams of maleic anhydride and 0.1 gram of azo-bisisobutyronitrile was continuously added into the reaction system during the first hours. At the end of the reaction period, the reaction mixture was cooled to room temperature and unreacted monomer vented out. The reaction product was dried in vacuo at 50 degrees centigrade to a constant weight. It was found that 70% conversion had been obtained. The powdery reaction product had a small particle size as determined using the optical microscope.

EXAMPLES 7 AND 8

The procedure and proportions of Examples 1 and 6 were repeated except that 50 percent of the vinyl chloride monomer was replaced by vinylidene chloride monomer. Small particle size, improved processing terpolymers were obtained.

EXAMPLES 9–15

The procedure and proportions of Example 6 was repeated except that vinyl acetate was in turn replaced by vinyl propionate, vinyl butyrate, vinyl valerate, vinyl caproate, vinyl pelargonate, vinyl glycolate, and vinyl lactate. Small particle size improved processing terpolymers were obtained.

Various modifications can be made in the invention without departing from the spirit thereof. Therefore, the foregoing specification is intended to illustrate the invention but not to limit it.

What is claimed is:

1. A bulk polymerized product of components comprising at least 70 percent by weight of a vinyl halide, about 1 to about 20 percent by weight of a vinyl ester comonomer and about 1 to about 10 percent by weight of an unsaturated organic anhydride selected from the group consisting of maleic anhydride and itaconic anhydride, based on the total weight of the monomer composition wherein said product has an average grain size of about 20 to about 40 microns and provided that said vinyl halide can be replaced by up to 50 percent of vinylidene halide.

2. The product of Claim 1 wherein said vinyl halide is vinyl chloride.

3. A bulk polymerized vinyl halide product comprising at least 70% by weight of a vinyl halide, about 1 to about 10 percent by weight of an unsaturated organic anhydride selected from the group consisting of maleic anhydride and itaconic anhydride, about 1 to about 20% by weight of a vinyl ester comonomer having 2 to about 20 carbon atoms in the ester group, all based on the total weight of the monomer composition and wherein said product has an average grain size of about 20 to about 40 microns.

4. The product of Claim 3 wherein said vinyl halide monomer is vinyl chloride and said vinyl ester monomer is vinyl acetate.

5. The product of Claim 3 wherein said vinyl ester monomer is vinyl propionate.

6. The product of Claim 3 wherein said vinyl ester monomer is vinyl laurate.

7. The product of Claim 3 wherein said vinyl ester monomer is vinyl stearate.

References Cited
UNITED STATES PATENTS

| | | | |
|---|---|---|---|
| 3,538,062 | 11/1970 | Thomas et al. | 260—78.5 |
| 3,219,636 | 11/1965 | Loshaek et al. | 260—78.5 |
| 3,166,534 | 1/1965 | Perrins | 260—80.5 |
| 3,522,227 | 7/1970 | Thomas | 260—92.8 |
| 2,855,387 | 10/1958 | Barrett | 260—78.5 |
| 2,845,404 | 7/1958 | Garner et al. | 260—78.5 |

JOSEPH L. SCHOFER, Primary Examiner

J. KIGHT III, Assistant Examiner

U.S. Cl. X.R.

260—78.5 T